United States Patent
Yashiki et al.

[11] Patent Number: 5,979,160
[45] Date of Patent: Nov. 9, 1999

[54] SYSTEM FOR DETECTING DETERIORATION OF EXHAUST GAS PURIFYING CATALYST FOR AUTOMOBILE ENGINE

[75] Inventors: Seiji Yashiki; Kazufumi Arino; Masanobu Kotoku; Kazuhiro Shinmoto, all of Hiroshima, Japan

[73] Assignee: Mazda Motor Corporation, Hiroshima, Japan

[21] Appl. No.: 08/889,154

[22] Filed: Jul. 7, 1997

[30] Foreign Application Priority Data

| Jul. 5, 1996 | [JP] | Japan | 8-176465 |
| Nov. 29, 1996 | [JP] | Japan | 8-319988 |
| Jun. 23, 1997 | [JP] | Japan | 9-166164 |

[51] Int. Cl.$^6$ .................................................. F01N 3/00
[52] U.S. Cl. .............................................. 60/276; 60/277
[58] Field of Search ........................... 60/274, 276, 277; 73/118.1

[56] References Cited

U.S. PATENT DOCUMENTS

| 5,228,287 | 7/1993 | Kurowishi et al. | 60/277 |
| 5,233,829 | 8/1993 | Komatsu | 60/276 |
| 5,724,809 | 3/1998 | Mitsutani et al. | 60/276 |

FOREIGN PATENT DOCUMENTS

| 3-57862 | 7/1989 | Japan |
| 6-42338 | 2/1994 | Japan |
| 6-249029 | 9/1994 | Japan |

*Primary Examiner*—Thomas E. Denion
*Attorney, Agent, or Firm*—Sixbey, Friedman, Leedom & Ferguson, PC; Donald R. Studebaker

[57] ABSTRACT

A diagnosis of deterioration and/or normality of an exhaust gas purifying catalyst is made by comparing a ratio of reversal frequencies of outputs from oxygen sensors disposed on opposite sides of the exhaust gas purifying catalyst with a threshold ratio. Discrimination is performed on both normality and deterioration in a standard gas quantity zone, on only normality in a large gas quantity zone, and on only deterioration in a small gas quantity zone, and nothing is made in an extra large gas quantity zone.

24 Claims, 12 Drawing Sheets

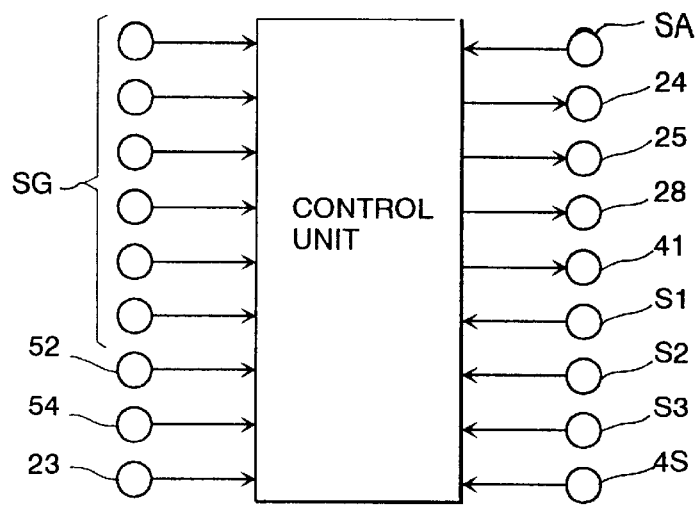
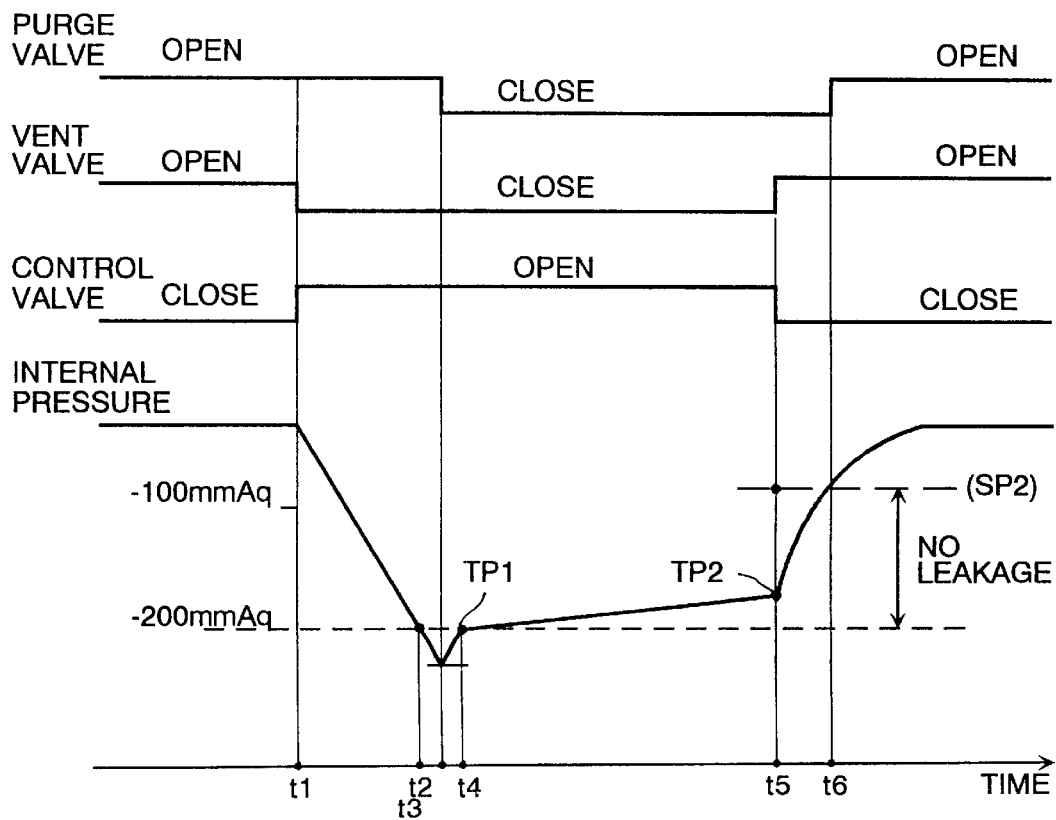

SYSTEM FOR DETECTING DETERIORATION OF EXHAUST GAS PURIFYING CATALYST FOR AUTOMOBILE ENGINE

BACKGROUND OF THE INVENTION

1. Field of the Invention

This invention relates to an apparatus for monitoring and diagnosing deterioration of a exhaust gas purifying catalyst used in an exhaust system of an automobile engine.

2. Description of Related Art

Engines, in particular automobile engines, are typically provided with an exhaust system with an exhaust gas purifying catalyst installed therein. Such an exhaust gas purifying catalyst possibly encounters a hardly negligible decline in gas purifying ratio due to thermal deterioration. In order to monitor and diagnose functional deterioration of the exhaust gas purifying catalyst, the utilization is made of a pair of oxygen ($O_2$) sensors disposed before and after the exhaust gas purifying catalyst in the exhaust system. Functional deterioration is monitored based on outputs from the oxygen ($O_2$) sensors. One of the catalyst deterioration monitoring techniques is known from, for example, Japanese Unexamined Patent Publication No. 6-249029.

Catalyst deterioration detection is performed by comparing a value relating to a ratio between the numbers of reversal of outputs, i.e. a ratio between reversal cycles of outputs, from the two oxygen ($O_2$) sensors with a threshold value. For example, a ratio of the number of reversal of output from the upstream oxygen ($O_2$) sensor to the number of reversal of output from the downstream oxygen ($O_2$) sensor (which is hereafter referred to as an output reversal ratio) takes a significantly large value when the exhaust gas purifying catalyst is functionally normal and, however, gradually declines with deterioration, i.e. a decline in purifying ratio, of the exhaust gas purifying catalyst. Accordingly, the exhaust gas purifying catalyst can be judged deteriorated when the output reversal ratio exceeds the threshold value.

As described in Japanese Unexamined Patent Publication No. 6-42338, the detection of deterioration of the exhaust gas purifying catalyst is interrupted upon an occurrence of a fault of a fuel injector or a fault of an exhaust gas recirculation system.

In the diagnosis of deterioration of the exhaust gas purifying catalyst performed by comparing an output reversal ratio with a threshold value, it has been proved that, although the exhaust gas purifying catalyst is functionally normal, it is apt to be judged deteriorated or that, although the exhaust gas purifying catalyst has been deteriorating, it is apt to be judged functionally normal. On study of the cause of wrong detection, it was found that the amount of exhaust gases passing the exhaust gas purifying catalyst produces a great effect on diagnosis of catalyst deterioration. In particular, The diagnosis of deterioration is greatly dominated by a ratio of the maximum amount of exhaust gas (passing through the exhaust gas purifying catalyst in a range where air-to-fuel ratio feedback control is available) relative to the capacity of the exhaust gas purifying catalyst. Specifically, the exhaust gas purifying catalyst purifies exhaust gas at a rate declined more when the amount of exhaust gas is large than when it is small. For this reason, even though the degree of deterioration of the exhaust gas purifying catalyst is the same, the output reversal ratio is smaller when the amount of exhaust gas passing through the exhaust gas purifying catalyst is large than when it is small.

For a moderate amount of exhaust gas, the exhaust gas purifying catalyst shows a lenient change in gas purifying ratio relative to a change in the output reversal ratio over a significantly broad range before and after a boundary between an unacceptable deteriorated state and a functionally normal state, it is definitely discriminated between these functional states at the threshold value taken as a boundary.

In a range of large amounts of exhaust gas and in a range of small amounts of exhaust gas, the exhaust gas purifying catalyst shows a significant change in gas purifying ratio relative to even a slight change in the output reversal ratio near the boundary between the unacceptable deteriorated state and the functionally normal state. Further, in the range of large amounts of exhaust gas, the range of output reversal ratios based on which the exhaust gas purifying catalyst is judged normal is significantly broad and, however, the range of output reversal ratios based on which the exhaust gas purifying catalyst is judged deteriorated is significantly narrow. For this reason, the exhaust gas purifying catalyst is apt to be judged deteriorated in the range of large amounts of exhaust gas although it is functionally normal. To the contrary, in the range of small amounts of exhaust gas, the range of output reversal ratios based on which the exhaust gas purifying catalyst is judged normal is significantly narrow and, however, the range of output reversal ratios based on which the exhaust gas purifying catalyst is judged deteriorated is significantly broad, so that the exhaust gas purifying catalyst is apt to be judged normal in the range of small amounts of exhaust gas although it is deteriorated.

In order to prevent the exhaust gas purifying catalyst from being faultily judged, while only a moderate range of amounts of exhaust gas may be utilized to perform the deterioration diagnosis, frequency with which the deterioration diagnosis is performed is reduced.

On the other hand, during the diagnosis of detrioration of the exhaust gas purifying catalyst, in order to improve the detectability of output from the oxygen ($O_2$) sensor for easy discrimination, it is popular to increase a gain in the air-to-fuel ratio feedback control. In such a case, unless the diagnosis of detrioration is completed, the increased gain remains effective, hunting is encountered under regular operating condition

SUMMARY OF THE INVENTION

It is accordingly an object of the invention to provide a diagnostic system of deterioration of an exhaust gas purifying catalyst which executes diagnosis of catalyst deterioration suitably for variations in the amount of exhaust gas flowing through the exhaust gas purifying catalyst.

The foregoing object of the invention is accomplished by providing a diagnostic system for diagnosis of functional states of an exhaust gas purifying catalyst based on comparison between a value relating to a ratio of frequencies of reversal of outputs from oxygen ($O_2$) sensors disposed on the opposite sides of the exhaust gas purifying catalyst and a threshold value. The diagnostic system detects a quantity value relating to an amount of exhaust gas flowing through the exhaust gas purifying catalyst, and performs discrimination between normality and deterioration of the exhaust gas purifying catalyst within a predetermined standard quantity zone where the quantity value takes a specified value and discrimination of normality of the exhaust gas purifying catalyst within a predetermined large quantity zone over upward the predetermined standard quantity zone. The diagnostic system interrupts the discrimination between normality and deterioration of the exhaust gas purifying catalyst within a predetermined extra large zone over upward the predetermined large quantity range. Otherwise the diagnostic system may perform discrimination of deterioration of the exhaust gas purifying catalyst within a predetermined small quantity range over downward the predetermined standard quantity zone. Further, the diagnostic system may interrupt discrimination between normality and deterioration of the exhaust gas purifying catalyst within an extra large zone over upward the predetermined large quantity range.

In accordance with another aspect of the invention, the diagnostic system performs discrimination between normality and deterioration of the exhaust gas purifying catalyst within the predetermined standard quantity zone where the quantity value takes a specified value, discrimination of normality of the exhaust gas purifying catalyst within a predetermined large quantity range over upward the predetermined standard quantity zone, and discrimination of deterioration of the exhaust gas purifying catalyst within a predetermined small quantity range over downward the predetermined standard quantity zone.

The diagnostic system interrupts discrimination of deterioration of the exhaust gas purifying catalyst before passage of a specified period of time from a transition of the engine operating condition from an enrich zone where an air-to-fuel ratio is made smaller than a stoichiometric air-to-fuel ratio to a feedback control zone where air-to-fuel feedback control is executed based on output from the oxygen ($O_2$) sensors. Further, the diagnostic system interrupts discrimination of deterioration of the exhaust gas purifying catalyst before passage of a specified period of time from a transition of the engine operating condition from a fuel cut zone where injection of fuel to the engine is cut off to the feedback control zone where air-to-fuel feedback control is executed based on output from the oxygen ($O_2$) sensors.

With the diagnostic system of the invention, only normality discrimination is executed in the large quantity zone where deterioration discrimination erroneously occurs over upward the standard quantity zone where discrimination between normality and deterioration is executed. As a result, because the diagnosis of deterioration is quickly performed over a wide range of the amount of exhaust gas, while diagnostic errors are eliminated, ordinary engine control is prevented from hunting even in the event where the amount of exhaust gas continues to fall on the small quantity zone for a long period of time.

Before passage of a specified period of time from a transition of the engine operating condition from an enrich zone where an air-to-fuel ratio is made smaller than a stoichiometric air-to-fuel ratio to a feedback control zone where air-to-fuel feedback control is executed based on output from the oxygen ($O_2$) sensors, the exhaust gas purifying catalyst encounters a rapid increase of HC emission. In this event, it is possibly hard to perform appropriately discrimination of deterioration based on output from the oxygen ($O_2$) sensors. However, the diagnostic system interrupts discrimination of deterioration of the exhaust gas purifying catalyst, eliminating erroneous discrimination.

Before passage of a specified period of time from a transition of the engine operating condition from a fuel cut zone where injection of fuel to the engine is cut off to the feedback control zone where air-to-fuel feedback control is executed based on output from the oxygen ($O_2$) sensors, the exhaust gas purifying catalyst encounters a rapid increase of oxygen. In this event, it is possibly hard to perform appropriately discrimination of deterioration. However, the diagnostic system interrupts discrimination of deterioration of the exhaust gas purifying catalyst, eliminating erroneous discrimination.

BRIEF DESCRIPTION OF THE DRAWINGS

The above and other objects and features of the present invention will be understood from the following description of a specific embodiment thereof when considering in conjunction with the accompanying drawings, in which:

FIG. 3 is a block diagram of a control system;

FIG. 4 is a time chart of operation of leakage judgement of the vapor purge system and fault detection of the control valve and vent valve;

DETAILED DESCRIPTION OF THE SPECIFIC EMBODIMENT

Figure 1:
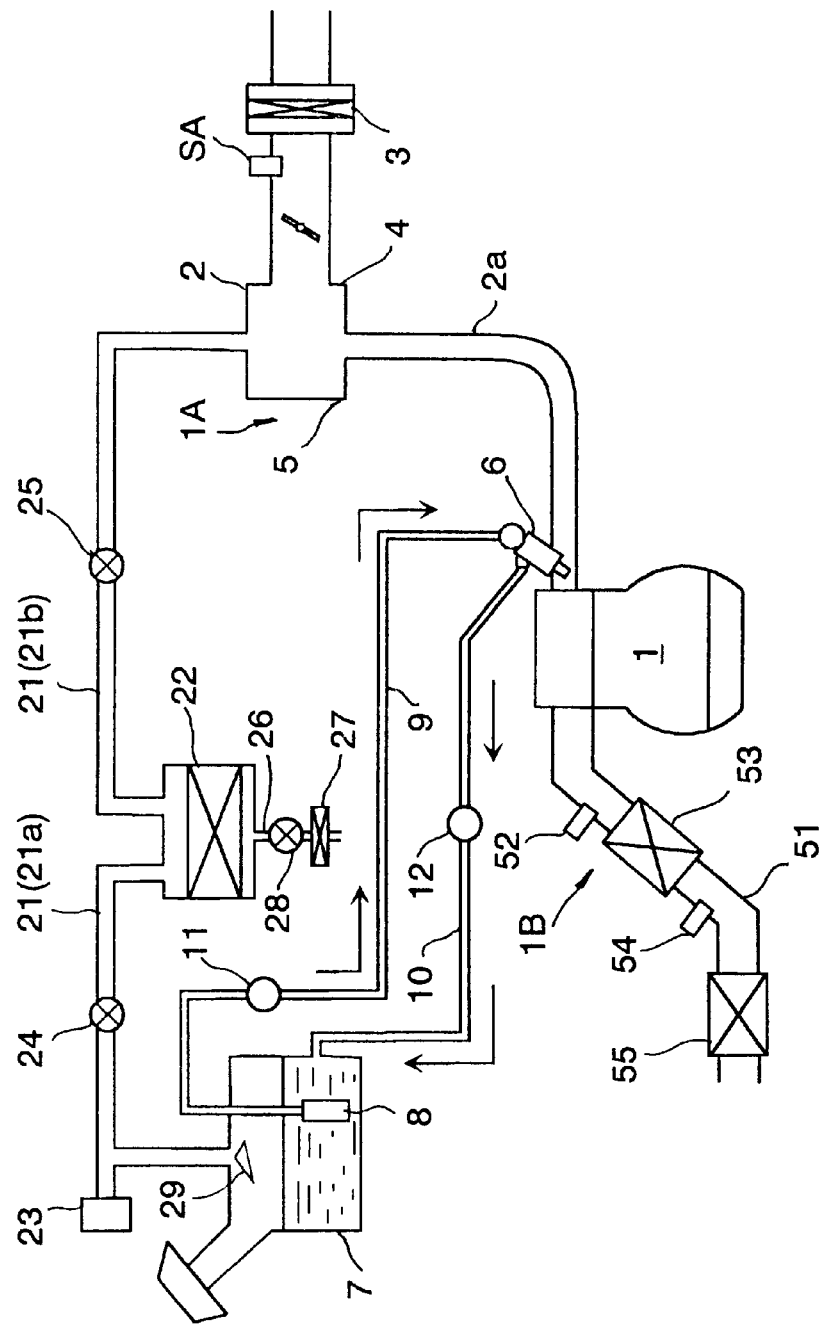
FIG. 1 is a schematic illustration of an engine equipped with a catalyst diagnostic system in accordance with an embodiment of the invention.

Referring to the drawings in detail, particularly to FIG. 1 which shows an engine 1 with an intake system 1A and an exhaust system 1B. The intake system 1A has an intake pipe 2 provided, in order from the upstream end to the downstream end, with an air cleaner 3, an air flow sensor SA, a throttle valve 4 and a surge tank 5. The intake pipe 2 branches off into discrete pipe sections 2a extending to cylinders (not shown) between the engine 1 and the surge tank 5 and a fuel injector 6 installed in each discrete pipe section 2a. The exhaust system 1B has an exhaust pipe 51 provided, in order from the upstream end to the downstream end, with an oxygen ($O_2$) sensor 52, a three-way exhaust gas purifying catalyst (which is hereafter referred to as a purifying catalyst for simplicity) 53, an oxygen ($O_2$) sensor 54, and a three-way purifying catalyst (which is hereafter referred to as a catalyst for simplicity) 55. Each oxygen ($O_2$) sensor 52, 54, which has a built-in electric heater (not shown) for an assurance of activation temperature, provides an output voltage showing a great change according to difference is in air-to-fuel ratio with respect to an ideal combustible air-to-fuel ratio for an stoichiometric fuel mixture (which is hereafter referred to as an stoichiometric air-to-fuel ratio). For example, the output voltage is changeable between 0 and 1 V and takes higher values for enriched fuel mixtures and lower values for lean fuel mixtures at an output voltage of 0.45 V as a boundary. It is noted that the term "rich air-to-fuel ratio" as used hereafter shall mean and refer to the air-to-fuel ratio for a fuel mixture richer than the stoichiometric fuel mixture and the term "lean air-to-fuel ratio" as used hereafter shall mean and refer to the air-to-fuel ratio for a fuel mixture leaner than the stoichiometric fuel mixture.

Liquid fuel is delivered by a fuel pump 8 from a fuel tank 7 to the fuel injector 6 through a fuel pipe 9 with a fuel filter 11. Surplus fuel is returned into the fuel tank 7 from the fuel injector 6 through a return pipe 10 provided with a pressure regulator 12. Fuel vapors in the fuel tank 7 is collected in the surge tank 7 through a purge pipe 21 connected to the fuel tank 7. The surge pipe 21 is provided with a canister 22 for adsorbing fuel vapors between an upstream purge pipe section 21a and a downstream purge pipe section 21b. The purge pipe 21 at the upstream purge pipe section 21a is provided, in order from the fuel tank 7 toward the canister 22, a pressure sensor 23 for monitoring pressure in the fuel tank 7 and a control valve 24 whose operation will be described in detail later. Further, the purge pipe 21 at the downstream purge pipe section 21b is provided with a purge valve 25. The purge valve 25 is of an electromagnetic type of duty solenoid valve and is linearly variable in opening between its closed position and a full throttle position according to duty ratio. The canister 22 has an air vent 26 provided with a filter 27 and an electromagnetic vent valve 28. The fuel tank 7 at a juncture to the purge pipe 21 has a roll-over valve 29 for preventing fuel leakage upon in the event where the vehicle rolls over. This roll-over valve 29 has a small full throttle opening or a full throttle resistance.

The control valve 24, which has basically two extreme operative positions, namely a fully closed position where it closes the purge pipe 21 and a full throttle position where it opens the purge pipe 21, serves as a breather valve to bring the canister 22 into communication with the fuel tank 7 when a specified pressure difference occurs before and after the control valve 24. As shown by way of example in FIG. 2 in detail, the control valve 24 has a valve seat 31 opening upward and a valve body 32 movable away from and to the valve seat 31. The movable valve body 32 comprises a cylindrical hollow shell 33 with its top closed, which serves as a movable core, and an elastic ring 34, such as a rubber ring, secured to the bottom thereof. When the valve body 32 moves down, the elastic ring 34 is seated on the valve seat 31. This elastic ring 34 is integrally formed with a pair of lip-shaped valve leaves 35A and 35B. The valve body 32 is formed with a hole 36 in the wall through which the interior and exterior are communicated with each other. The cylindrical hollow shell 33 is supported by means of a diaphragm 37 pushed down by a return spring 38 so as to force the elastic ring 34 against the valve seat 31.

Figure 2:
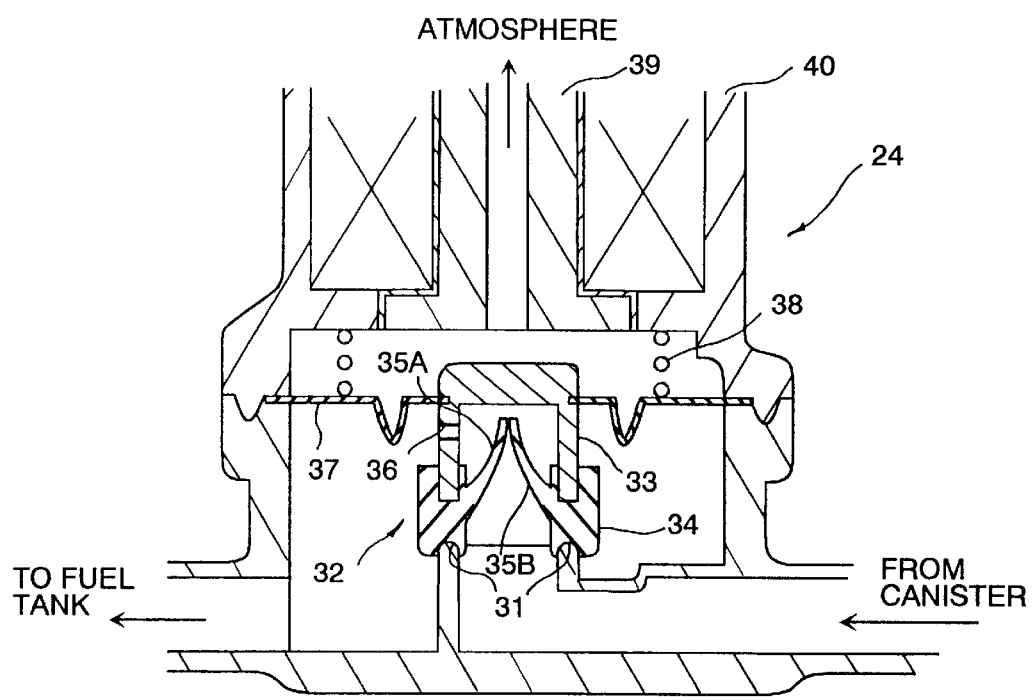
FIG. 2 is a cross-sectional view of a control valve of a vapor purge system.

Above the cylindrical hollow shell 33 as a movable core, there is installed a stationary core shell 39 surrounded by a coil 40. When the coil 40 is relaxed as shown in FIG. 2, the elastic ring 34 is pressed against the valve seat by the return spring 38 to close the purge pipe 21. In this state, when the canister 22 is applied with negative pressure, i.e. the pressure is lower on the side of canister 22 than on the side of fuel tank 7, the lip-shaped valve leaves 35A and 35B are attracted to each other, preventing the interior of the fuel tank 7 encountering an increase in negative pressure. To the contrary, when the fuel tank 7 reduces its internal negative pressure lower than a specified level, i.e. the pressure is lower by a specified pressure in the fuel tank 7 than on the side of canister 22, the lip-shaped valve leaves 35A and 35B are forced apart from each other, bringing the fuel tank 7 and the canister 22 into communication with each other through the hole 36 to prevent the fuel tank 7 from further reducing the internal negative pressure which is so called a breathing function. In this instance, the hole 36 has a small aperture area and has a throttling resistance. As apparent, the control valve 24 functions on one hand as a two-way valve which opens slightly under normal conditions and closes in response to an occurrence of a specified reduction in the internal negative pressure of the canister from the internal negative pressure in the fuel tank 7 and on the other hand as a bypass valve which brings the fuel tank 7 and the canister 22 into direct communication with each other.

When exciting the coil 40, the stationary core 39 attracts the movable core, i.e. the cylindrical hollow shell 33 to bring the elastic ring 34 away from the valve seat 31, fully opening the purge pipe 21, so as to bring the fuel tank 7 and the canister 22 into direct communication with each other. At the full throttle position, the control valve 24 has no throttling resistance. Fuel vapors from the fuel tank 7 passes through the control valve 24 and enters into the canister 22 and stored. Because the vent valve 28 ordinarily remains open, the purge valve 25 is opened during operation of the engine under specified conditions to purge fuel vapors into the intake pipe 2 in which negative pressure develops. The upstream oxygen ($O_2$) sensor 52 is used to feedback control the amount of fuel delivered by the fuel injector 8 so as to maintain a stoichiometric air-to-fuel ratio. In addition, the upstream oxygen ($O_2$) sensor 52 is used together with the downstream oxygen ($O_2$) sensor 54 to detect deterioration of the purifying catalyst 53 based on their outputs.

FIG. 3 is a block diagram of a control unit 100 comprising a microcomputer, a read only memory (ROM) and a random access memory (RAM). Control signals are transferred to the control unit 100 from various sensors and switches, namely the pressure sensor 23, the air flow sensor SA, the oxygen ($O_2$) sensors 52 and 54, a group of switches S1 through S4, and a group of other sensors inclusively labeled SG. Command signals are transferred to various operative elements such as the control valve 24, the purge valve 25, the vent valve 28 and a warning device 41 such as a warning lamp or a warning buzzer. Sensors S1 and S2 monitor the temperature of engine cooling water and the rotational speed of engine 1. Switch S1, which is called an idle switch, detects in the closed position. The group of sensors SG detects data or information on at least throttle opening, atmospheric pressure and vehicle speed necessary to perform control which will be described later.

Control unit 100 performs air-to-fuel ratio feedback control, detection of fuel leakage of the purge system including the fuel tank 7, the purge pipe 21 and the canister 22, and diagnosis of deterioration of the purifying catalyst 53. The fuel leakage detection is basically performed basically following the steps shown in FIG. 4. While the purge valve 25 remains open to purge fuel vapors, the control valve 28 is opened simultaneously with closing the vent valve 28 at a time t1, exerting negative pressure in the fuel tank 7 through the purge pipe 21. As a result, the internal pressure in the fuel tank 7 gradually declines. When the fuel tank internal pressure reaches a specific level of, for example, −200 mmAq (water level) at a time t2 and exceeds slightly the specific level at a time t3, the purge valve 25 is closed to shut off the purge pipe 21 from the atmosphere. At a time t4 a few moment later from the closing of the purge valve 25, the pressure sensor 23 detects the fuel tank internal pressure (TP1) risen to the specific level of −200 mmAq. At this time t4, a delay in intake pressure transmission to the fuel tank 7 caused due to throttling resistance of the roll-over valve 29 is dissolved. At a time t5 after passage of a specified time, for example 30 seconds. from the time t4, the pressure sensor 23 detects a fuel tank internal pressure TP2.

Fuel leakage is detected by comparing the pressure difference TPd between the fuel tank internal pressures TP1 and TP2 with a threshold value. Specifically, if the pressure difference TPd is significant and greater than the threshold value, this indicates that fuel is possibly leaking from somewhere in the fuel purge system, for example a hole formed in the purge pipe 21, then, the fuel purge system is judged faulty. On the other hand, the pressure difference TPd is slight and smaller than the threshold value, the fuel purge system is judged normal. At the time t5, while the vent valve 28 is opened and the control valve 24 is closed after the fuel leakage detection, however, the purge valve 25 remains open for a specified period of time to a time t6 for the purpose of judgment of faults of these valves 24 and 28. If a rising rate at which the pressure detected by the pressure sensor 23 rises is less than a prescribed standard rate within the specific period of time between the times t5 and t6, it is judged that the vent valve 28 encounters such a fault as to lock in its closed position for some reasons or that the air vent 26 is blocked. On the other hand, if a rising rate at which the pressure detected by the pressure sensor 23 rises is less than a prescribed standard rate within the specific period of time between the times t5 and t6, it is judged that the vent valve 28 encounters such a fault as to lock in its open position for some reasons. Further, in the event where the fuel tank internal pressure does not rise back to a specified level of approximately −100 mmAq, it is assumed that the control valve 24 locks in its closed position after the vent valve 28 has locked in its open position, which is regarded as an occurrence of an abnormal state where a large amount of fuel vapors enters into the intake system 1A.

Figure 18:
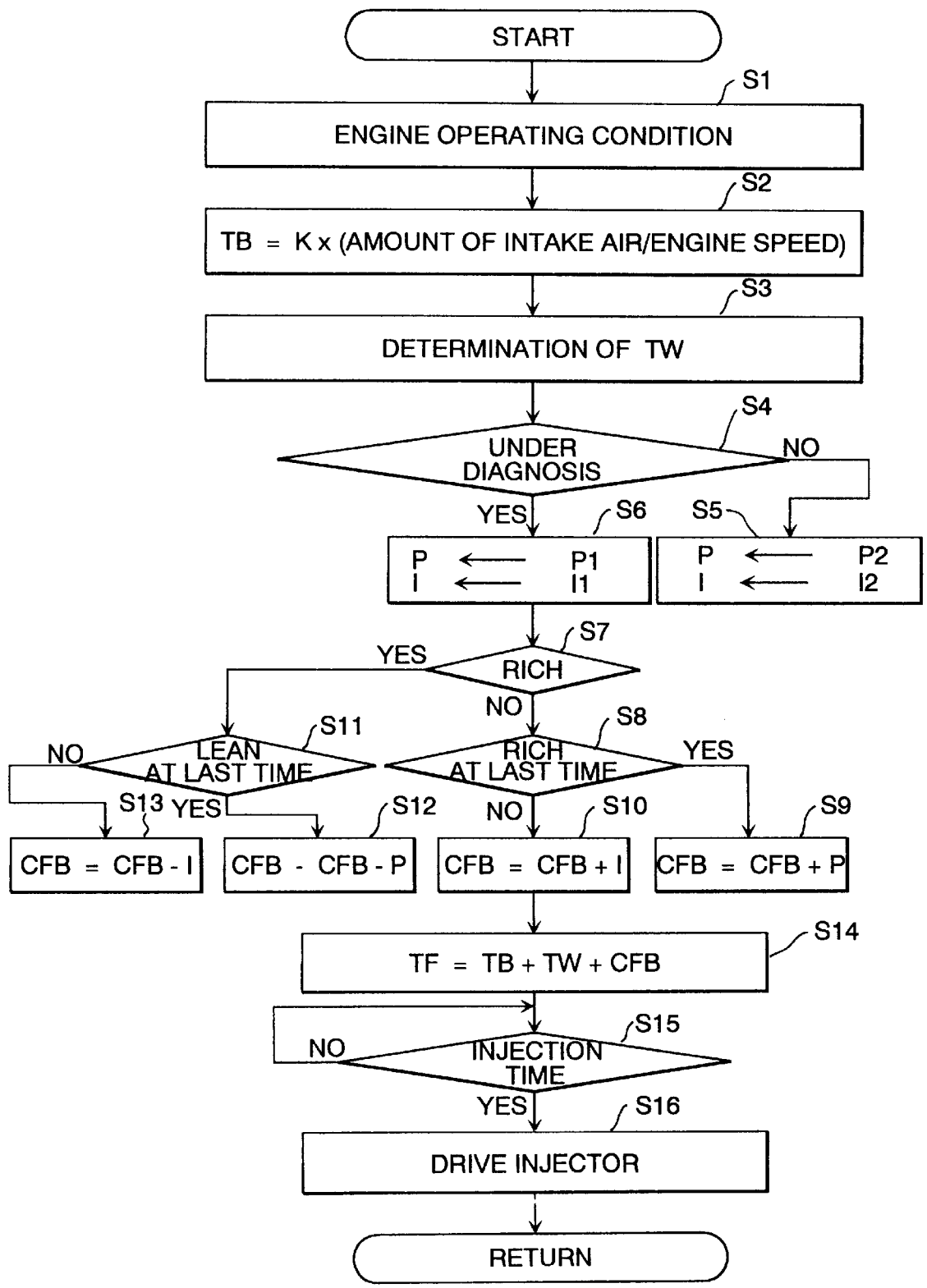
FIG. 18 is a flow chart illustrating a sequence routine of the air-to-fuel ratio feedback control.

FIG. 18 is a flow chart illustrating a sequence routine of the air-to-fuel ratio feedback control which is executed as an interruption routine at every predetermined crank angle. When the flow chart logic commences and control passes directly to a function block at step S1 where an engine operating condition is detected. The engine operating detection depends on an amount of intake air, a rotational speed of engine, a temperature of engine cooling water, an air-to-fuel ratio, etc. At step S2, a basic amount of fuel TB is computed based on a conversion factor K, the amount of intake air and the rotational speed of engine. At step S3, a correction amount of fuel TW is subsequently determined according to the temperature of cooling water from a correction map. The correction map defines the correction amount of fuel so as to increase as the temperature of cooling water declines. A determination is made at step S4 as to whether the diagnosis of deterioration of the purifying catalyst 53 is under execution. When the result of the determination is negative, the control gains P and I for the air-to-fuel ratio feedback control are set to P2 and I2, respectively, at step S5. On the other hand, when the result of the determination is affirmative, control gains P and I for the air-to-fuel ratio feedback control are respectively set to P1 and I1 which are greater than the control gains P2 and I2, respectively, at step S6. That is, the control gains P and I take increased values during execution of the diagnosis of deterioration of the purifying catalyst 53. In this instance, the control gain P2 is sufficiently greater than the control gain I1.

After setting the control gains P and I appropriately at step S5 or S6, a determination is made at step S7 as to whether an output from the oxygen ($O_2$) sensor indicates a rich air-to-fuel ratio. When the result is negative, this indicates that the output indicates a lean air-to-fuel ratio, then, a determination is subsequently made at step S8 as to whether the last output from the oxygen ($O_2$) sensor indicates a rich air-to-fuel ratio. When the result is affirmative, this indicates that the output has turned from the rich side to the lean side, then, a feedback control value CFB is increased at one stroke by the control gain P at step S9. On the other hand, when the result is negative, this indicates that the output remains on the lean side, then, the feedback control value CFB is gradually increased by the control gain I at step S10. Further, when the result of the determination concerning the output from the oxygen ($O_2$) sensor is affirmative, a determination is subsequently made at step S11 as to whether the last output from the oxygen ($O_2$) sensor indicates a lean air-to-fuel ratio. When the result is affirmative, this indicates that the output has turned from the lean side to the rich side, then, a feedback control value CFB is decreased at one stroke by the control gain P. On the other hand, when the result is negative, this indicates that the output remains on the rich side, then, the feedback control value CFB is gradually decreased by the control gain I.

After changing the feedback control value CFB at any one of steps S9, S10, S12 and S13, an eventual amount of fuel TF is computed by adding the basic amount of fuel TB, the correction amount of fuel TW and the feedback control value CFB together at step S14. Thereafter, a determination is made at step S15 as to whether it is time to inject fuel. This determination is repeated until the injection time is present. Finally, at step S13, an injection signal is provided so as to cause the fuel injector to deliver fuel of the eventual amount TF.

Figure 5:
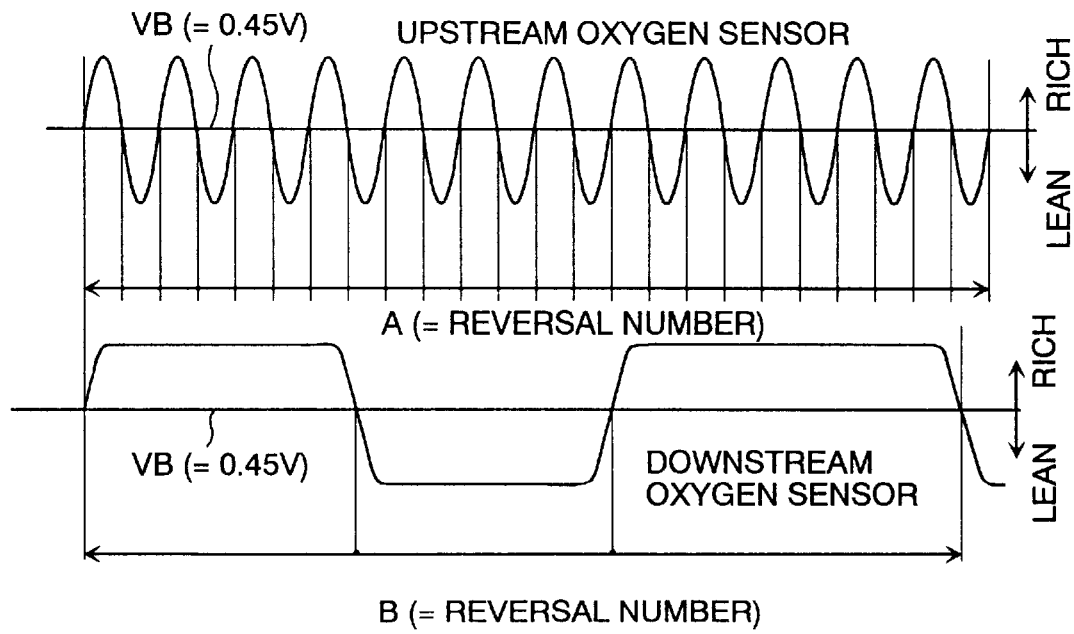
FIG. 5 is a graphical illustration showing outputs from oxygen ($O_2$) sensors.
Figure 6:
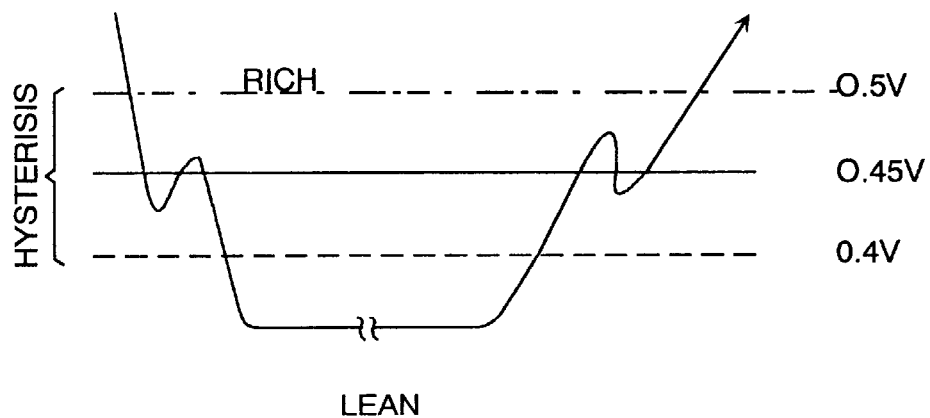
FIG. 6 is a graphical illustration showing an output from the oxygen ($O_2$) sensor which is provided with hysterisis.

The following description will be directed to the diagnosis of deterioration of the purifying catalyst 53. During execution of the air-to-fuel ratio feedback control, the oxygen ($O_2$) sensors 52 and 54 provide outputs considerably frequently reversed as shown in FIG. 5. Letting A and B be the number of output reversal of the oxygen ($O_2$) sensor 52 upstream from the purifying catalyst 53 and the number of output reversal of the oxygen ($O_2$) sensor 54 downstream from the purifying catalyst 53, respectively, an output reversal ratio A/B defines the relationship between the outputs from the oxygen ($O_2$) sensors 52 and 54. As shown in FIG. 6, in order to count output reversal, the output is given a hysterisis between rich and lean air-to-fuel ratios. Specifically, upper and lower threshold values, for example 0.5 V and 0.4 V, respectively, are established other than the middle value (0.45 V). The fuel mixture is judged rich when the output is higher than the upper threshold value or lean when the output is lower than the lower threshold value. The utilization of these upper and lower threshold values prevents counting high frequency components which are apt to occur when an output reverses between levels for rich and lean air-to-fuel ratios as the number of output reversal and realizes an accurate output reversal ratio A/B. As long as the purifying catalyst 53 is normal, the output reversal ratio A/B takes a large value to infinity. On the other hand, with progress of deterioration of the purifying catalyst 53, because the number of reversal of the output from the downstream oxygen ($O_2$) sensor 54 increases, the output reversal ratio A/B gradually becomes small. For example, if an output reversal ratio A/B given when the purifying catalyst 53 declines in its efficiency to a purification rate of approximately 60% as a result of deterioration is defined as a threshold ratio, the purifying catalyst 53 is judging normal when an effective output reversal ratio A/B is greater than the threshold ratio or judged abnormal when it is smaller than the threshold ratio. In this embodiment, only one invariable threshold ratio is established for deterioration judgment of the purifying catalyst 53.

Figure 7:
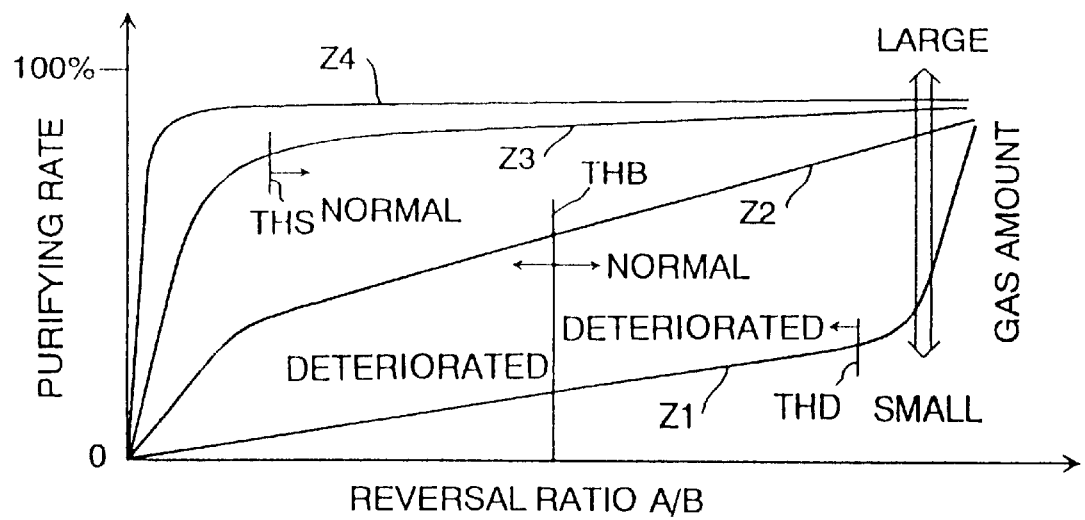
FIG. 7 is a diagram showing the relationship between output reversal ratio and purifying rate.

As shown in FIG. 7, the characteristic of the output reversal ratio A/B with respect to the gas purifying ratio of the purifying catalyst 53 varies according to the amount of exhaust gas or the amount of intake air. Specifically, basically the reversal ratio A/B shows a decline with an increase in the amount of exhaust gas even for the same gas purifying ratio. As shown by a characteristic curve Z3 in FIG. 7, if the amount of exhaust gas is large, the gas purifying ratio shows a significant change in response to a slight change in the output reversal ratio A/B in a range of small output reversal ratios where gas purifying ratios have to be examined or judged for discrimination between functional normality and deterioration. For this reason, it is hard to establish a threshold ratio for judgment. In view of the above, the threshold ratio is established according to the large amount of exhaust gas so as to perform judgment of normality only when the amount of exhaust gas is large. To the contrary, as shown in a characteristic curve Z1 in FIG. 7, if the amount of exhaust gas is small, the gas purifying ratio shows a significant change in response to a slight change in the output reversal ratio A/B in a range of large output reversal ratios where gas purifying ratios have to be examined or judged for discrimination between functional normality and deterioration. For this reason, the threshold ratio is established according to the small amount of exhaust gas so as to perform judgment of deterioration only when the amount of exhaust gas is small. As shown by a characteristic curve Z2, if the amount of exhaust gas is moderate, the gas purifying ratio changes leniently and linearly in response to changes in the output reversal ratio A/B. Because the gas purifying ratio shows a slight change correspondingly to a slight change in the output reversal ratio A/B in a range of large output reversal ratios where gas purifying ratios have to be examined or judged for discrimination between functional normality and deterioration, the purifying catalyst is definitely judged on both deterioration and normality when the amount of exhaust gas is moderate. For this reason, in this embodiment, the threshold ratio is established to such a value as to enable judgment of functional normality and deterioration to be performed. As a result, either one of these judgment is performed when the amount of exhaust gas is large or small. As shown in FIG. 7, a fixed threshold ratio THB for deterioration judgment of the purifying catalyst 53 is established for a gas purifying ratio of approximately 60%. For large amounts of exhaust gas, the purifying catalyst 53 is judged functionally normal when the output reversal ratio A/B is greater than the threshold ratio THB. If the output reversal ratio A/B is greater than a reference threshold ratio THS, the purifying catalyst 53 is definitely judged functionally normal. On the other hand, for small amounts of exhaust gas, the purifying catalyst 53 is judged functionally deteriorated when the output reversal ratio A/B is smaller than the threshold ratio THB. If the output reversal ratio A/B is smaller than a reference threshold ratio THD, the purifying catalyst 53 is definitely judged functionally deteriorated. The relation between gas purifying ratio and output reversal ratio for extra large amounts of exhaust gas is shown by a characteristic curve Z4 in FIG. 7. In cases where there is a extra large amount of exhaust gas, it is hard to establish a threshold ratio for the diagnosis of deterioration of the purifying catalyst, judgment may not be made on deterioration nor on functional normality.

Figure 8:
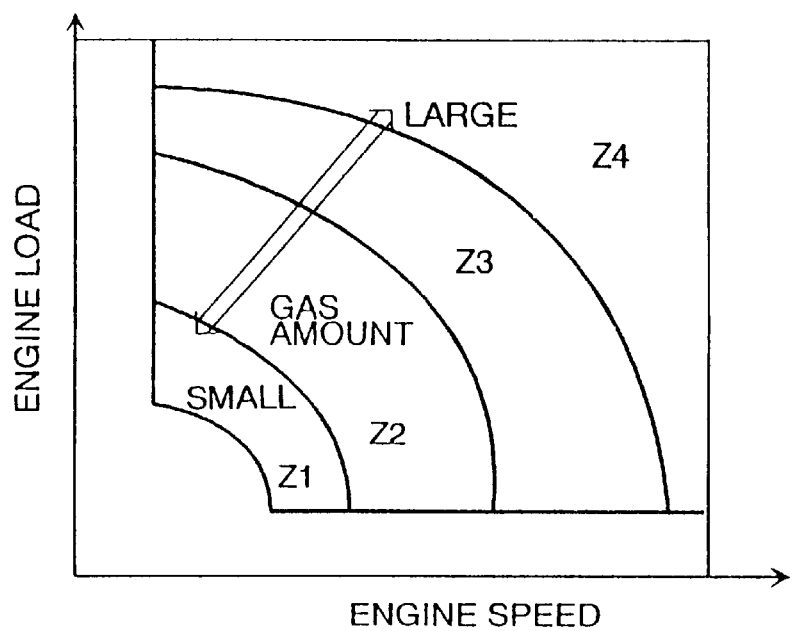
FIG. 8 is an illustration showing gas quantity zones.

As shown in FIG. 8, the amount of exhaust gas is divided by equi-quantity lines into a plurality of, for example four in this embodiment, exhaust gas quantity regions Z1–Z4 with parameters, i.e. engine load and engine speed. The characteristic curves Z1–Z4 represent typical characteristics corresponding to these exhaust quantity regions Z1–Z4, respectively. The smallest exhaust gas quantity region Z1 is defined as a region where the purifying catalyst 53 is possibly hard to be activated and utilized to interrupt the diagnosis of deterioration of the purifying catalyst 53.

Figure 9:
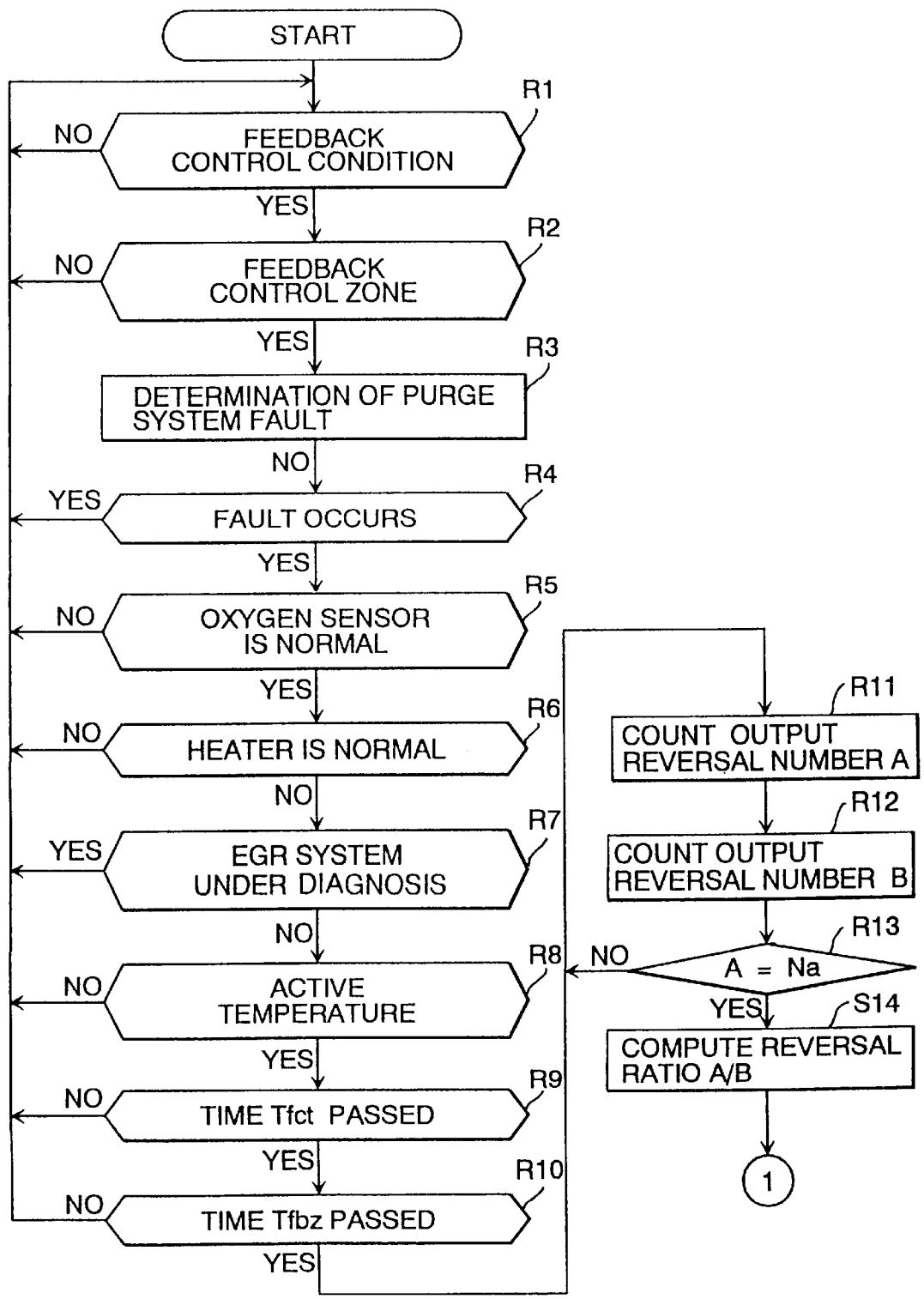
FIGS. 9 and 10 is a flow chart illustrating a sequence routine of the deterioration diagnosis of the exhaust gas purifying catalyst.
Figure 10:
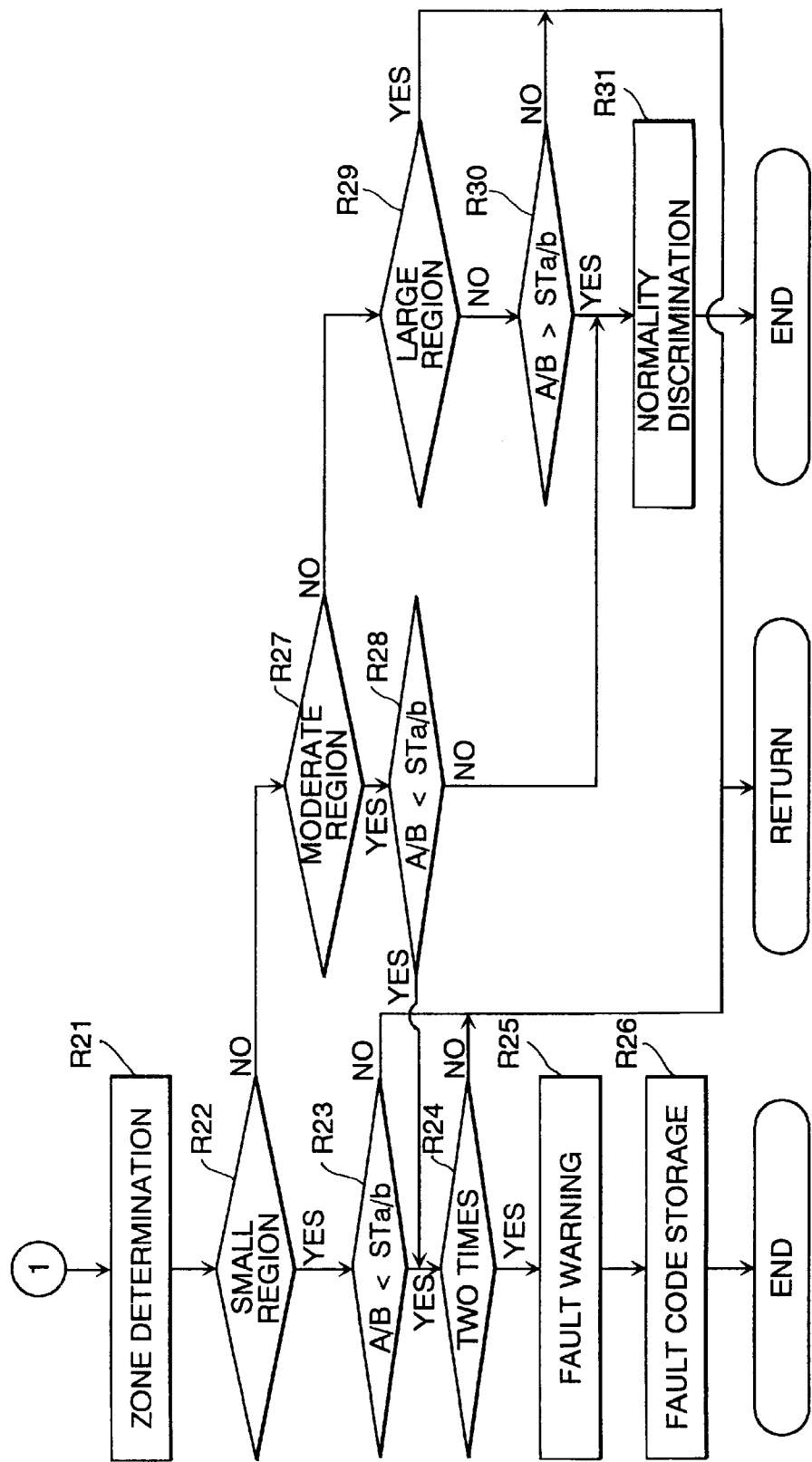

The operation of the diagnostic system of deterioration or faults of exhaust gas purifying catalyst depicted in FIGS. 1 through 3 will be best understood by reviewing FIGS. 9 and 10 which is a flow chart illustrating a sequence routine of the deterioration diagnosis of exhaust gas purifying catalyst. This sequence routine is performed as an interruption processing every a predetermined cycle of, for example, 200 msec. When the flow chart logic commences and control passes directly to step R1 where a determination is made as to whether the engine operates within a condition suitable for execution of an air-to-fuel feedback control. This condition may be specified by, for example, the temperature of engine cooling water above a specified level and there is no demand for a corrective increase in the amount of fuel to be delivered after engine start-up. When the engine operates in the air-to-fuel feedback control condition, a determination is subsequently made at step R2 as to whether the engine operates within an engine operating zone for an air-to-fuel ratio feedback control This air-to-fuel ratio feedback control zone is specified as a zone where the engine operates at low or middle speeds and partial loads, excluding a zone immediately after engine start-up, an enrich zone where an air-to-fuel ratio richer than the stoichiometric air-to-fuel ratio is delivered and a deceleration fuel cut zone. When the engine operates within the air-to-fuel ratio feedback control zone, a determination is made at step R3 relating to an occurrence of a fault of the valves 24 and 27 in the fuel purge system, i.e. a lock of the control valve 24 in its open position and/or a lock of the vent valve 27 in its closed position, as was previously described.

At step R4, a determination is made as to whether the result of judgment at step R3 indicates a fault of the fuel purge system. When there is no indication of a fault of the fuel purge system, a determination is made at step R5 as to whether the oxygen ($O_2$) sensors 52 and 54 operate normally or encounters a fault such as the breakdown of wires. When there is no fault, another determination is subsequently made at step R6 as to whether there is occurred the breakdown of the heater of each oxygen ($O_2$) sensor 52, 54. In the event where there is no breakdown of the heater, a determination is made at step R7 as to such a fault of the exhaust gas recirculation (EGR) system that an exhaust gas recirculation valve repeatedly opens and closes. In the event where there is nor fault of the exhaust gas recirculation (EGR) system, a determination is made at step R8 as to whether the purifying catalyst 53 attains a specified activation temperature Tact. The temperature of the purifying catalyst 53 may be directly detected by means of a temperature sensor, or otherwise may be theoretically estimated as will be described in detail later. When the purifying catalyst 53 has been appropriately activated, a determination is made at step R9 as to whether a specified period of time Tfct has passed from a point of time of a transition of engine operating condition from an engine operating condition for fuel cut to an engine operating condition for resumption of fuel injection. This time period Tfct is defined as a time necessary for the purifying catalyst 53 to shift from a state where it adsorbs oxygen in excess due to fuel cut to a state where it adsorbs oxygen moderately and is typically, for example, approximately 4 to 5 seconds. Thereafter, a determination is further made at step R10 as to whether a specified period of time Tfbz has passed from a point of time of a transition of engine operating condition from an enrich zone to an air-to-fuel ratio feedback control zone. This time period Tfbz is defined as a time necessary for the purifying catalyst 53 to shift from a state where it adsorbs oxygen in excess due to enriching a fuel mixture to a state where it adsorbs oxygen moderately and is typically, for example, approximately 2 seconds. After passage of the time period Tfbz, the diagnosis of deterioration of the purifying catalyst 53 is executed through steps R11–R31. In any event where the answer to the determination made previously is negative, the diagnosis of deterioration is canceled and the flow chart logic orders the sequence routine to return to step R1.

In the diagnosis of deterioration of the purifying catalyst 53, the number of reversal A of output from the oxygen ($O_2$) sensor 52 is counted at step R11, and the number of reversal B of output from the oxygen ($O_2$) sensor 54 is subsequently counted at step R12. At step R13, a determination is made as to whether the number of output reversal A reaches a specified number Na, i.e. a specific time has passed from a point of time of commencement of counting the number of output reversal A. This determination repeated until the number of output reversal A reaches the specified number Na. Thereafter, an output reversal ratio A/B between the numbers of reversal A and B of the outputs from the oxygen ($O_2$) sensors 52 and 54 is computed at step R14. Subsequently, a determination is made at step R21 (FIG. 10) by looking up a map shown in FIG. 8 to discriminate among three regions, i.e. the smallest exhaust gas quantity region Z1, the moderate exhaust gas quantity region Z1, and the large exhaust gas quantity regions including a medium large and the largest exhaust gas quantity regions Z3 and Z4. This determination is made based on an output from the air flow sensor SA (see FIG. 1). At step R22, a determination is made as to whether the amount of exhaust gas falls on the smallest exhaust gas quantity region Z1. If it is in the smallest exhaust gas quantity region Z1, a determination is subsequently made at step R23 as to whether the output reversal ratio A/B is less than a threshold ratio STa/b. This determination is repeated until an affirmative result is ascertained consecutively two times at step R24. When the a affirmative result is ascertained tow times, this indicates that the purifying catalyst 53 encounters functional deterioration, then, after giving a warning of deterioration as a fault at step R25 and storing a code of the fault at step R26, the flow chart logic terminates the sequence routine. The determination made at step R23 may be repeated more than two times to eliminate a wrong judgment that the purifying catalyst 53 is functionally deteriorated. As apparent, in the smallest exhaust gas quantity ergion Z1, judgment relating to the functional normality of the purifying catalyst 53 is not made.

On the other hand, as a result of the determination concerning the smallest exhaust gas quantity region Z1 made at step R22, it is found that the amount of exhaust gas is out of the smallest exhaust gas quantity region Z1, another determination is made at step R27 as to whether the amount of exhaust gas falls on the moderate exhaust gas quantity region Z2. If it is in the moderate exhaust gas quantity region Z2, a determination is subsequently made at step R28 as to whether the output reversal ratio A/B is less than the threshold ratio STa/b. If the output reversal ratio A/B is less than the threshold ratio, This determination is repeated until an affirmative result is ascertained consecutively two times at step R24. When the result is affirmative, after giving a warning of deterioration as a fault at step R25 and storing a code of the fault at step R26, the flow chart logic terminates the sequence routine. When the result of the determination concerning the output reversal ratio made at step R28 is negative, after judging the purifying catalyst functionally normal at step R31, the flow chart logic calls for another sequence routine without making functional judgement of the purifying catalyst 53.

When the result of the determination concerning the moderate exhaust gas quantity region Z2 is negative, a determination is made at step R29 as to whether the amount of exhaust gas falls on the extra large exhaust gas quantity region Z4. If the result is affirmative, the flow chart logic calls for another sequence routine without making functional judgement of the purifying catalyst 53. On the other hand, when the result of the determination made at step R29 is negative, a determination concerning the output reversal ratio A/B is subsequently made at step R30. When the result is negative, the flow chart logic calls for another sequence routine without making functional judgement of the purifying catalyst 53. On the other hand, when the result is affirmative, after judging the purifying catalyst functionally normal at step R31, the flow chart logic terminates the sequence routine.

Figure 11:
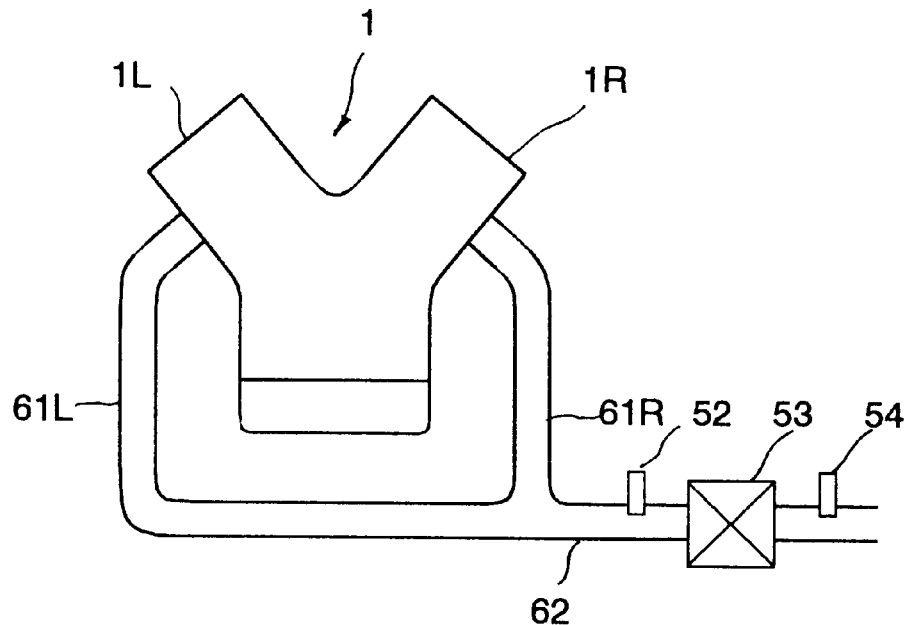
FIG. 11 is a schematic illustration showing a variation of an exhaust system.

FIG. 11 shows a V-type six cylinder engine having a feature of deterioration diagnosis of the purifying catalyst in accordance with another embodiment of the invention. The engine consists of left and right cylinder banks 1L and 1R arranged in a V-formation with a predetermined relative angle. These left and right cylinder banks 1L and 1R have discrete exhaust manifolds 61L and 61R, respectively which are joined together to a common exhaust pipe 62. The common exhaust pipe 62 is provided with oxygen ($O_2$) sensors 52 and 54 and a purifying catalyst 53 disposed between the oxygen ($O_2$) sensors 52 and 54. During execution of the air-to-fuel ratio feedback control, the amount of fuel to be delivered is controlled based on an output from the oxygen ($O_2$) sensor 52 commonly to cylinders of the left and right cylinder banks 1L and 1R. In this instance, since exhaust gases from all the six cylinders pass through the purifying catalyst 53, a value obtained by dividing the maximum displacement of the engine (which is the total amount of exhaust gas from a plurality of cylinders when the exhaust gas is directed to the purifying catalyst 53 all at once) by the capacity of the purifying capacity is small (less than a specific value). Consequently, frequency of in discrimination between functional normality and deterioration can be increased by reducing the extent of the largest exhaust gas quantity region Z3.

Figure 12:
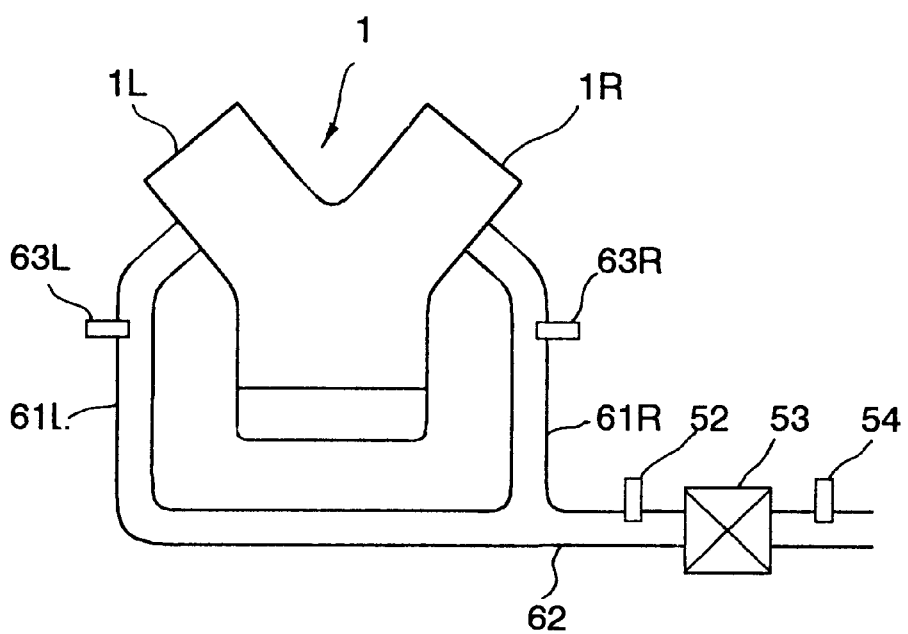
FIG. 12 is a schematic illustration showing another variation of an exhaust system.

FIG. 12 shows a V-type six cylinder engine, similar to that of FIG. 11, having a feature of deterioration diagnosis of the purifying catalyst in accordance with another embodiment of the invention. The engine consists of left and right cylinder banks 1L and 1R arranged in a V-formation with a predetermined relative angle. These left and right cylinder banks 1L and 1R have discrete exhaust manifolds 61L and 61R, respectively which are joined together to a common exhaust pipe 62. These discrete exhaust manifolds 61L and 61R are provided with oxygen ($O_2$) sensors 63L and 63R, respectively. The common exhaust pipe 62 is provided with oxygen ($O_2$) sensors 52 and 54 and a purifying catalyst 53 disposed between the oxygen ($O_2$) sensors 52 and 54. The oxygen ($O_2$) sensors 63L and 63R are used only to perform the air-to-fuel ratio feedback control independently for the left and right cylinder banks 1L and 1R. respectively. The oxygen ($O_2$) sensors 52 and 54 are used only to perform the deterioration diagnosis.

Figure 13:
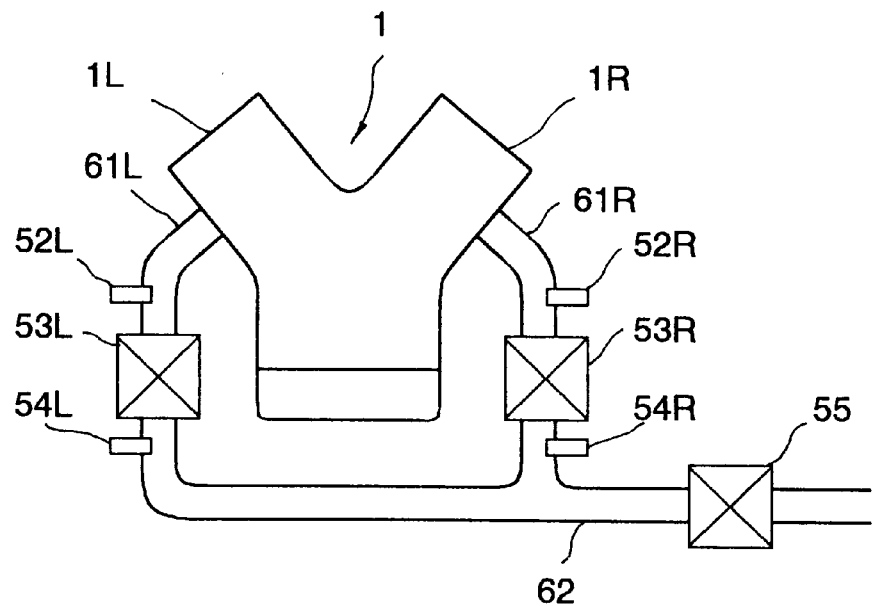
FIG. 13 is a schematic illustration showing a further variation of an exhaust system.

FIG. 13 shows a V-type six cylinder engine having a feature of deterioration diagnosis of the purifying catalyst in accordance with another embodiment of the invention. The engine consists of left and right cylinder banks 1L and 1R arranged in a V-formation with a predetermined relative angle. These left and right cylinder banks 1L and 1R have discrete exhaust manifolds 61L and 61R, respectively which are joined together to a common exhaust pipe 62. These discrete exhaust manifolds 61L and 61R are provided with purifying catalysts 53L and 53R (which correspond to the purifying catalyst 53 in FIG. 1), respectively. The common exhaust pipe 62 is provided with a purifying catalyst 55 (which corresponds to the purifying catalyst 55 in FIG. 1). Each discrete manifold 61L, 61R is provided with oxygen ($O_2$) sensors 52L and 54L (which correspond to the oxygen ($O_2$) sensors 52, 54 in FIG. 1), 52R and 54R (which correspond to the oxygen ($O_2$) sensors 52, 54 in FIG. 1), disposed on both sides of the purifying catalyst 53L, 53R. The deterioration diagnosis is performed for the purifying catalyst 53L by use of the oxygen ($O_2$) sensors 52L and 54L and for the purifying catalyst 53R by use of the oxygen ($O_2$) sensors 52R and 54R. Further, The air-to-fuel ratio feedback control is performed independently for the left and right cylinder banks 1L and 1R by use of the oxygen ($O_2$) sensors 52L and 52R, respectively.

The common exhaust pipe 62 is provided with oxygen ($O_2$) sensors 52 and 54 and a purifying catalyst 53 disposed between the oxygen ($O_2$) sensors 52 and 54. The oxygen ($O_2$) sensors 63L and 63R are used only to perform the air-to-fuel ratio feedback control independently for the left and right cylinder banks 1L and 1R, respectively. The oxygen ($O_2$) sensors 52 and 54 are used only to perform the deterioration diagnosis. In this instance, since exhaust gases from all the six cylinders pass through the purifying catalyst 53, a value obtained by dividing the maximum displacement of the engine (which is the total amount of exhaust gas from a plurality of cylinders when the exhaust gas is directed to the purifying catalyst 53 all at once) by the capacity of the purifying capacity is small (less than a specific value). Consequently, frequency of in discrimination between functional normality and deterioration can be increased by reducing the extent of the largest exhaust gas quantity region Z3. On the other hand, since the purifying catalyst 53L, 53R has only a small capacity resulting from constraints on layout and low temperature activity, and consequently the value or ratio of the maximum displacement of the engine relative to the capacity of the purifying capacity is large, precise discrimination between functional normality and deterioration can be made by expanding the extent of the largest exhaust gas quantity region Z3 for normality judgment on the side of lower engine speed and lower engine load, or otherwise reducing or removing the extent of the smallest exhaust gas quantity region Z1. Further, the purifying catalyst 53L, 53R may be precisely judged normal or deteriorated by making the threshold reversal ratio (A/B) for deterioration diagnosis small.

Figure 14:
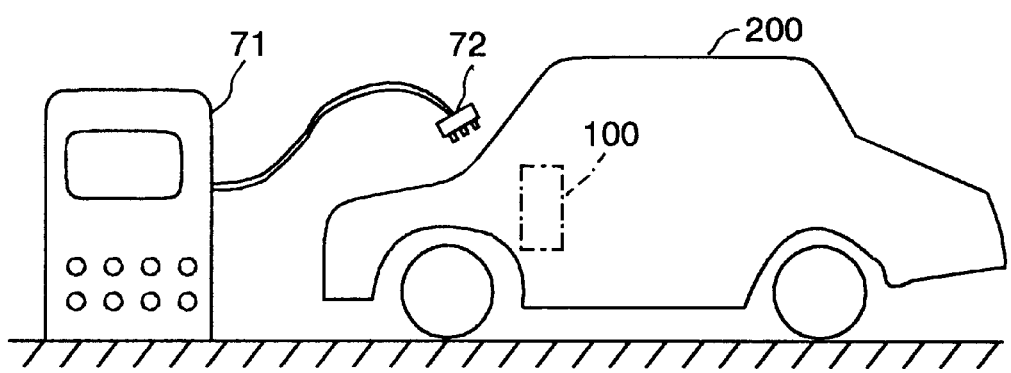
FIG. 14 is a schematic illustration showing an external type of catalyst diagnostic system in accordance with another embodiment of the invention.

FIG. 14 illustrates an external deterioration diagnostic apparatus 71 installed in, for example, a service workshop, which has a computer programmed to perform the deterioration diagnosis routine as shown in FIGS. 9 and 10. The external deterioration diagnostic apparatus 71 has a coupler 72 able to connect to a control unit 100 (see FIG. 3) built in a vehicle 200. Data signals necessary to perform deterioration diagnosis of the purifying catalyst are transferred to the apparatus 71 from the control unit 100 through the coupler 72. At the workshop, an engine of the vehicle 200, which may have or may not have a computer programmed to perform the deterioration diagnostic routine as shown in FIG. 9 and 10, is driven, automatically or manually, to satisfy requirements for the deterioration diagnosis.

Figure 15:
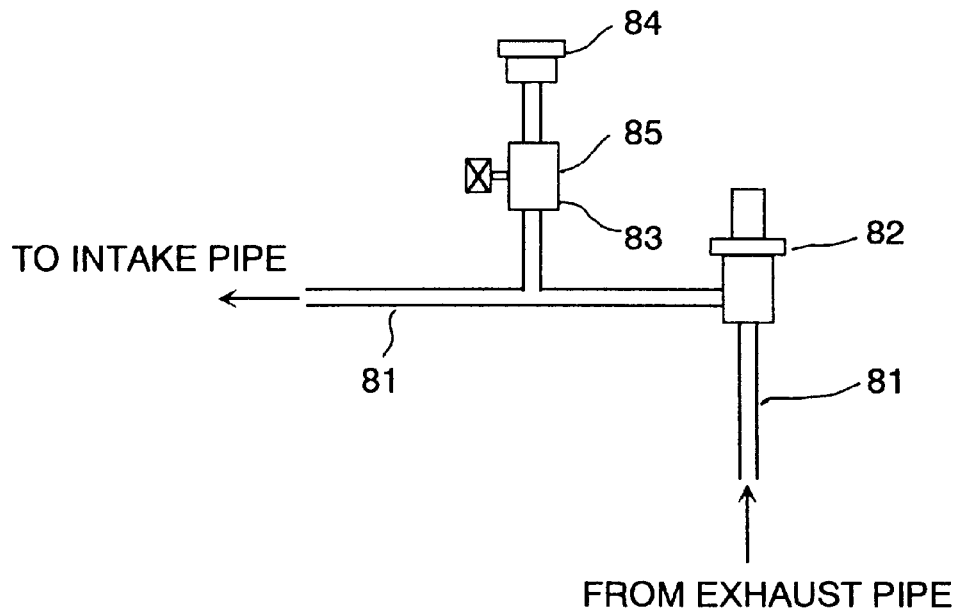
FIG. 15 is a schematic illustration showing an essential part of an exhaust gas recirculation (EGR) system

FIG. 15 shows an exhaust gas recirculation (EGR) system of which fault determination is made in the sequence routine of the deterioration diagnosis of exhaust gas purifying catalyst at step R7. As shown, an exhaust gas recirculation pipe 81 by means of which the intake pipe 2 and the exhaust pipe 51 are connected is provided with an exhaust gas circulation valve 82. The exhaust gas recirculation pipe 81 has a branch pipe 83 branching off therefrom and having a pressure sensor 84 and a switching valve 85. The switching valve 85 causes the pressure sensor 84 to detect selectively atmospheric pressure and pressure in the exhaust gas recirculation pipe 81. In a state where the pressure sensor 84 detects pressure in the exhaust gas recirculation pipe 81, the exhaust gas recirculation valve 82 repeatedly opens and closes several times, for example five times on condition that the engine operates under a normal condition. Every time the exhaust gas recirculation valve 82 opens and closes, the pressure sensor 84 detects a change in pressure caused in the exhaust gas recirculation pipe 81. An average pressure change is compared with a threshold value to detect a lock of the exhaust gas recirculation valve 82. A small average pressure change is regarded to results from a lock of the exhaust gas recirculation valve 82.

During idling, fault diagnosis is executed for the switching valve 85 prior to for the exhaust gas recirculation valve 82. During switching the pressure sensor 84 between detection of pressure in the exhaust gas recirculation pipe 81 (first pressure) and atmospheric pressure (second pressure), a pressure difference between the first and second pressure is compared with the specified threshold pressure. The switching valve 85 is judged faulty when the pressure difference is significantly lower than the specified threshold pressure level. However, in cold circumstances, for example the temperature of intake air is lower than 10° C., because it is hard to precisely judge a fault of the switching valve 85, the fault diagnosis may be ignored.

As was previously mentioned, the temperature of the purifying catalyst 53 may be theoretically estimated in place of direct detection by means of a temperature sensor. For this purpose, the latest temperature Tn is computed by the following formula:

$$Tn = T_{(n-1)} + Kg \times Kw \times (Tm - T_{(n-1)})$$

where Tn is the latest temperature of the purifying catalyst;

$T_{(n-1)}$ is the temperature of the purifying catalyst one time before;

Tm is the temperature of the purifying catalyst read on a map;

Kg is a correction factor (Kg<1) proportional to the amount of exhaust gas which corresponds to the amount of intake air; and Kw is a correction factor (Kw<1) proportional to the temperature of engine cooling water.

This computation is periodically repeated every one second.

Figure 16:
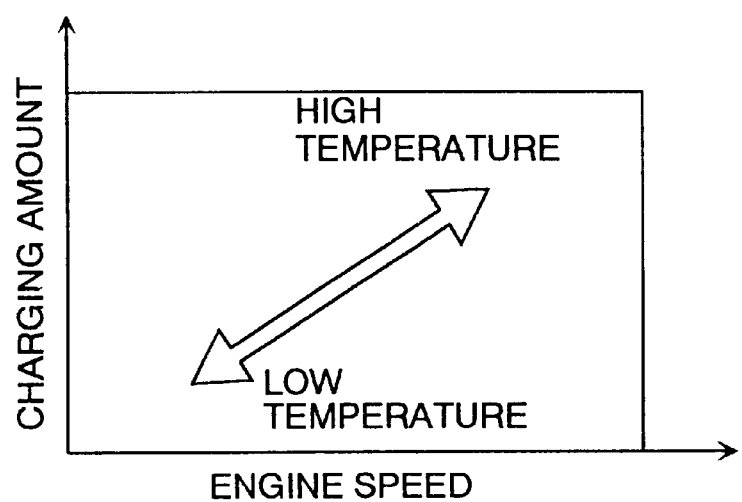
FIG. 16 is an illustration showing a map used to estimate the temperature of an exhaust gas purifying catalyst.

As shown in FIG. 16, the temperature Tm read on map is determined by engine speed and charging rate (a value of the amount of intake air divided by engine speed of rotation) as parameters and used as a steady state estimated gas temperature. This map temperature becomes higher with an increase in engine speed and charging amount of intake air. At the beginning of the temperature Tn, the temperature of cooling water is used as the catalyst temperature $T_{(n-1)}$ one time before. The second member $[Kg \times Kw \times (Tm-T_{(n-1)})]$ of the formula indicates an increase in catalyst temperature from the last.

Figure 17:
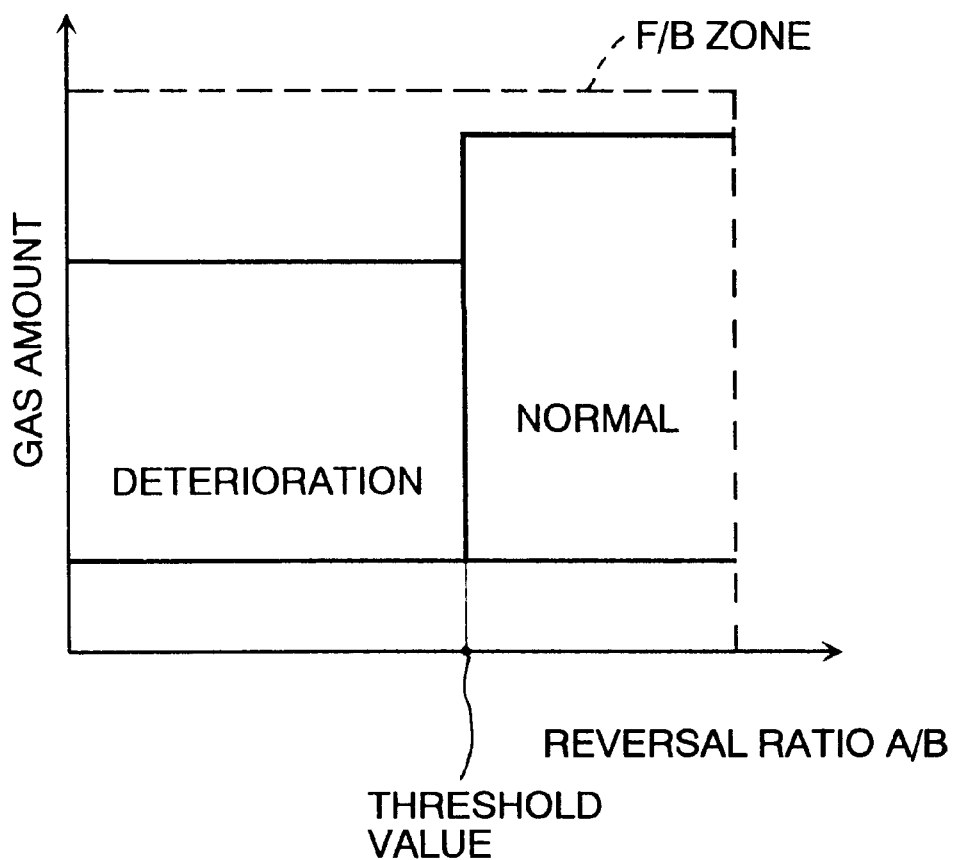
FIG. 17 is an illustration showing discrimination zones for normality and deterioration with a fixed threshold value.

FIG. 17 shows region defined with the amount of exhaust gas and output reversal ratio as parameters for judgment of normality and deterioration of the purifying catalyst 53 in the case of using a fixed threshold value. The normal zone covers output reversal ratios A/B greater than the threshold value. The deteriorated zone covers output reversal ratios A/B smaller than the threshold value. The normal zone covers the maximum amount of exhaust gas greater than the deteriorated zone covers.

In the above embodiment, the threshold value THB (see FIG. 7) for discrimination of normality and deterioration of the purifying catalyst 53 may be changed so as to be larger with an increase in the amount of exhaust gas in all of the quantity regions for execution of at least one of normal discrimination and deterioration discrimination. Otherwise, it may be changed only in the quantity region (region Z2) for execution of both normal discrimination and deterioration discrimination and invariable in other quantity regions (regions Z1 and Z3). Changing the threshold value is executed, for example, after counting the number of reversal A of output from the oxygen ($O_2$) sensor 52 at step R11 in the deterioration diagnostic routine shown in FIGS. 9 and 10.

It is preferred to execute only normality discrimination in the large quantity region for the engine which has ratio of a maximum displacement relative to a capacity of the exhaust gas purifying catalyst less than a specified ratio. Further, it is desirable to execute only deterioration discrimination in the small quantity region for the engine which has ratio of a maximum amount of exhaust gas flowing through the purifying catalyst relative to a capacity of the purifying catalyst less than a specified ratio.

A demand for execute of both normality and deterioration discrimination in the large quantity region is fulfilled by using a purifying catalyst having a large capacity. For example, when the V-type six-cylinder engine shown in FIG. 13 has a maximum displacement of 2500 cc., the purifying catalyst 53L, 53R for each cylinder bank 1L, 1R is suitable to have a capacity of larger than 600 cc which is approximately 50% of the maximum amount of exhaust gas (approximately 1250 cc) flowing through the purifying catalyst 53L, 53R. In such a case where the purifying catalyst 53L, 53R having such a large capacity is hard to be installed within the engine compartment of the vehicle, it may be installed under the floor of the vehicle. While using purifying catalysts having a small capacity is preferable in the point of view of expanded the quantity region for execution of both normality and deterioration discrimination toward the more smaller quantity region, however, such a purifying catalyst is undesirable in the point of view of purifying efficiency.

The amount of exhaust gas may be divided into two exhaust gas quantity regions including at least a standard quantity region for execution of normality and deterioration discrimination. The other quantity region may be for either execution of normality discrimination or execution of deterioration discrimination. Selection is preferably made in consideration of the ratio of a capacity of the purifying catalyst relative to the maximum amount of exhaust gas flowing through the catalyst.

It is to be understood that the present invention may be embodied with various changes, modifications and improvements, which may occur to those skilled in the art, without departing from the spirit and scope of the invention defined in the following claims.

What is claimed is:

1. A diagnostic system for performing diagnosis of functional states of an exhaust gas purifying catalyst installed in an exhaust system of an engine based on comparison between value relating to a ratio of frequencies of reversal of outputs from oxygen ($O_2$) sensors disposed on the opposite sides of the exhaust gas purifying catalyst and a threshold value while the engine operates in a specified operating state, said catalyst diagnostic system comprising:

engine operating condition detecting means for detecting an engine operating condition in said specified operating state;

exhaust gas detecting means for detecting an amount of exhaust gas flowing through the exhaust gas purifying catalyst; and diagnostic means for performing discrimination as to whether the exhaust gas purifying catalyst is normal or has been deteriorating while said engine operating condition is in a specified first zone where said amount of exhaust gas is in a specified range, prohibiting said discrimination but performing discrimination of normality of the exhaust gas purifying catalyst while said engine operating condition is in a specified second zone where said amount of exhaust gas is greater than said specified range, and terminating said diagnosis of functional states of the exhaust gas purifying catalyst when the exhaust gas purifying catalyst is discriminated to be normal.

2. A catalyst diagnostic system as defined in claim 1, wherein said threshold value is fixed in spite of change in said amount of exhaust gas.

3. A catalyst diagnostic system as defined in claim 1, wherein said threshold value is variable according to changes in said amount of exhaust gas.

4. A catalyst diagnostic system as defined in claim 1, wherein said diagnostic means interrupts said discrimination of deterioration of the exhaust gas purifying catalyst before passage of a specified period of time from a transition of said engine operating condition from an enrich zone where an air-to-fuel ratio is made smaller than a stoichiometric air-to-fuel ratio to a feedback control zone where air-to-fuel feedback control is executed based on output from the oxygen ($O_2$) sensors.

5. A catalyst diagnostic system as defined in claim 1, wherein said diagnostic means interrupts said discrimination of deterioration of the exhaust gas purifying catalyst during execution of diagnosis of a failure of an exhaust gas recirculation system with an exhaust gas recirculation valve remaining open.

6. A catalyst diagnostic system as defined in claim 1, wherein said diagnostic means interrupts said discrimination of deterioration of the exhaust gas purifying catalyst before passage of a specified period of time from a transition of said engine operating condition from a fuel cut zone where injection of fuel to the engine is cut off to a feedback control zone where air-to-fuel feedback control is executed based on output from the oxygen ($O_2$) sensors.

7. A catalyst diagnostic system as defined in claim 1, and further comprising a temperature sensor to detect temperature of the exhaust gas purifying catalyst, wherein said diagnostic means interrupts said discrimination of deterioration of the exhaust gas purifying catalyst when said temperature is lower then a specific temperature necessary for activation of the exhaust gas purifying catalyst.

8. A catalyst diagnostic system as defined in claim 1, wherein said exhaust gas purifying catalyst is disposed closer said engine than another exhaust gas purifying catalyst installed in said exhaust system.

9. A catalyst diagnostic system as defined in claim 1, wherein said exhaust purifying catalyst is disposed in an exhaust manifold of the exhaust system.

10. A catalyst diagnostic system as defined in claim 1, wherein said diagnostic means changes an engine control value so that said discrimination as to whether the exhaust gas purifying catalyst is normal or has been deteriorating is easy to occur.

11. A catalyst diagnostic system as defined in claim 10, and further comprising air/fuel ratio control means for performing air/fuel ratio feedback control based on said output from said oxygen ($O_2$) sensor disposed on the upstream side of the exhaust gas purifying catalyst to provide a specified air/fuel ratio, wherein said diagnostic means changes said engine control value by increasing a gain of said air/fuel ratio feedback control.

12. A catalyst diagnostic system as defined in claim 1, wherein said exhaust gas detecting means detects an amount of intake air based on which said amount of exhaust gas is calculated.

13. A catalyst diagnostic system as defined in claim 1, wherein said diagnostic means prohibiting said discrimination but performing discrimination of deterioration of the exhaust gas purifying catalyst only while said engine operating condition is in a specified third zone where said amount of exhaust gas is less than said specified amount, and terminates said diagnosis of functional states of the exhaust gas purifying catalyst when the exhaust gas purifying catalyst is discriminated to have been deteriorating.

14. A catalyst diagnostic system for performing diagnosis of functional states of an exhaust gas purifying catalyst installed in an exhaust system of an engine based on comparison between a value relating to a ratio of frequencies of reversal of outputs from oxygen ($O_2$) sensors disposed on the opposite sides of the exhaust gas purifying catalyst and a threshold value, said catalyst diagnostic system comprising:

engine operating condition detecting means for detecting an engine operating condition in said specified operating state;

exhaust gas detecting means for detecting an amount of exhaust gas flowing through the exhaust gas purifying catalyst; and diagnostic means for performing discrimination as to whether the exhaust gas purifying catalyst is normal or has been deteriorating while said engine operating condition is in a specified first zone where said amount of exhaust gas is in a specified range, prohibiting said discrimination but performing discrimination of deterioration of the exhaust gas purifying catalyst while said engine operating condition is in a specified second zone where said amount of exhaust gas is less than said specified range, and terminating said diagnosis of functional states of the exhaust gas purifying catalyst when the exhaust gas purifying catalyst is discriminated to have been deteriorating.

15. A catalyst diagnostic system as defined in claim 14, wherein said exhaust gas purifying catalyst is disposed in an exhaust passage of said exhaust system outside of an engine compartment of a vehicle.

16. A catalyst diagnostic system as defined in claim 14, wherein said threshold value is fixed in spite of change in said amount of exhaust gas.

17. A catalyst diagnostic system as defined in claim 14, wherein said threshold value is variable according to changes in said amount of exhaust gas.

18. A catalyst diagnostic system as defined in claim 14, wherein said diagnostic means changes an engine control value so that said discrimination as to whether the exhaust gas purifying catalyst is normal or has been deteriorating is easy to occur.

19. A catalyst diagnostic system as defined in claim 18, and further comprising air/fuel ratio control means for performing air/fuel ratio feedback control based on said output from said oxygen ($O_2$) sensor disposed on the upstream side of the exhaust gas purifying catalyst to provide a specified air/fuel ratio, wherein said diagnostic means changes said engine control value by increasing a gain of said air/fuel ratio feedback control.

20. A catalyst diagnostic system as defined in claim 14, wherein said exhaust gas detecting means detects an amount of intake air based on which said amount of exhaust gas is calculated.

21. A diagnostic system for performing diagnosis of functional states of an exhaust gas purifying catalyst installed in an exhaust system of an engine based on comparison between a value relating to a ratio of frequencies of reversal of outputs from oxygen ($O_x$) sensors disposed on the opposite sides of the exhaust gas purifying catalyst and a threshold value while the engine operates in a specified operating state, said catalyst diagnostic system comprising:

an engine operating condition detecting sensor operative to detect an engine operating condition in said specified operating states;

an exhaust gas sensor operative to detect an amount of exhaust gas flowing through the exhaust gas purifying catalyst; and a diagnostic unit operative to perform discrimination as to whether the exhaust gas purifying catalyst is normal or has been deteriorating while said engine operating condition is in a specified first zone where said amount of exhaust gas is greater than a specified range, prohibiting said discrimination but performing discrimination of normality of the exhaust gas purifying catalyst while said engine condition is in a specified second zone where said amount of exhaust gas is greater than said specified range, and terminating said diagnosis of functional states of the exhaust gas purifying catalyst when the exhaust gas purifying catalyst is discriminated to be normal.

22. A catalyst diagnostic system as defined in claim 21, and further comprising an air/fuel ratio control unit operative to perform air/fuel ratio feedback control based on said output from said oxygen ($O_2$) sensor disposed on the upstream side of the exhaust gas purifying catalyst to provide a specified air/fuel ratio, wherein said diagnostic unit means changes an engine control value by increasing a gain of said air/fuel ratio feedback control so that said discrimination as to whether the exhaust gas purifying catalyst is normal or has been deteriorating is easy to occur.

23. A catalyst diagnostic system for performing diagnosis of functional states of an exhaust gas purifying catalyst installed in an exhaust system of an engine based on comparison between a value relating to a ratio of frequencies of reversal of outputs from oxygen ($O_2$) sensors disposed on the opposite sides of the exhaust gas purifying catalyst and a threshold value, said catalyst diagnostic system comprising:

an engine operating condition sensor operative to detect an engine operating condition in said specified operating states;

an exhaust gas sensor operative to detect an amount of exhaust gas flowing through the exhaust gas purifying catalyst; and a diagnostic unit operative to perform discrimination as to whether the exhaust gas purifying catalyst is normal or has been deteriorating while said engine operating condition is in a specified first zone where said amount of exhaust gas is in a specified range, prohibits said discrimination but performs discrimination of deterioration of the exhaust gas purifying catalyst while said engine operating condition is in a specified second zone where said amount of exhaust gas is less than said specified range, and terminates said diagnosis of functional states of the exhaust gas purifying catalyst when the exhaust gas purifying catalyst is discriminated to have been deteriorating.

24. A catalyst diagnostic system as defined in claim 23, and further comprising an air/fuel ratio control unit operative to perform air/fuel ratio feedback control based on said output from said oxygen ($O_2$) sensor disposed on the upstream side of the exhaust gas purifying catalyst to provide a specified air/fuel ratio, wherein said diagnostic unit means changes an engine control value by increasing a gain of said air/fuel ratio feedback control so that said discrimination as to whether the exhaust gas purifying catalyst is normal or has been deteriorating is easy to occur.

* * * * *